(12) United States Patent
Takahashi

(10) Patent No.: US 9,630,262 B2
(45) Date of Patent: Apr. 25, 2017

(54) METHOD OF MANUFACTURING MEMBER HAVING CLOSED-BOTTOM HOLE PORTION, AND WORKING TOOL

(75) Inventor: Toshiaki Takahashi, Mitoyo (JP)

(73) Assignee: TOYO TANSO CO., LTD., Osaka-shi (JP)

( * ) Notice: Subject to any disclaimer, the term of this patent is extended or adjusted under 35 U.S.C. 154(b) by 411 days.

(21) Appl. No.: 13/576,545

(22) PCT Filed: Jan. 31, 2011

(86) PCT No.: PCT/JP2011/051856
§ 371 (c)(1),
(2), (4) Date: Aug. 1, 2012

(87) PCT Pub. No.: WO2011/093482
PCT Pub. Date: Aug. 4, 2011

(65) Prior Publication Data
US 2012/0297601 A1    Nov. 29, 2012

(30) Foreign Application Priority Data

Feb. 1, 2010   (JP) ................................ 2010-019948

(51) Int. Cl.
B25F 1/00       (2006.01)
B23B 39/16      (2006.01)
(Continued)

(52) U.S. Cl.
CPC .......... B23B 51/0413 (2013.01); B23D 61/18 (2013.01); *Y10T 29/49794* (2015.01)

(58) Field of Classification Search
CPC .... B23B 51/0413; B23D 61/18; B23D 57/00; B23D 57/0007; B23D 57/003;
(Continued)

(56) References Cited

U.S. PATENT DOCUMENTS 1,017,922 A * 2/1912 Sheron ............................ 83/159
1,245,432 A * 11/1917 Brown .......................... 83/307.1
(Continued)

FOREIGN PATENT DOCUMENTS

JP     63-149110 A     6/1988
JP     1-117814 U      8/1989
(Continued)

OTHER PUBLICATIONS

Video: How to Make Clay Pottery Candlesticks: Clay Pottery CandleSticks: Trimming Base—https://youtu.be/RDX2bAYnBpw at 1:03, uploaded Sep. 26, 2008.*
(Continued)

*Primary Examiner* — Sarang Afzali
*Assistant Examiner* — Darrell C Ford
(74) *Attorney, Agent, or Firm* — Westerman, Hattori, Daniels & Adrian, LLP

(57) ABSTRACT

Provided are a method of manufacturing, and a working tool for, a member having a closed-bottom hole portion that can achieve a good yield of the material, can improve the durability of the cutting blade, and can reduce the force required for the work, by forming a hollowed-out bottom portion using a cutting wire having a two-point support. A method of manufacturing a member having a closed-bottom hole portion by inside-removing-working a raw material made of a carbonaceous material, the closed-bottom hole portion having a hollowed-out side portion and a hollowed-out bottom portion formed by hollowing out an inner portion of the raw material, including: a step of forming a cylindrical trench by digging the raw material frontward from a near-side end face of raw material while rotating the raw material, to form the hollowed-out side portion; and a step of forming the hollowed-out bottom portion by supporting a cutting wire inserted into a bottom portion of the cylindrical trench
(Continued)

at two points while rotating the raw material, and pressing the cutting wire being supported at the two points in a direction approaching an axis line of the raw material.

3 Claims, 14 Drawing Sheets

(51) Int. Cl.
 *B23G 1/20* (2006.01)
 *B23B 47/00* (2006.01)
 *B28B 11/12* (2006.01)
 *B23B 41/00* (2006.01)
 *B23B 51/04* (2006.01)
 *B23D 61/18* (2006.01)

(58) Field of Classification Search
 CPC . B23P 13/02; B23P 15/00; B26D 1/46; B26D 1/547; B29C 2793/0009
 USPC ............ 29/557, 558; 83/651.1, 307.1–307.3; 408/22, 23, 31, 42, 49, 50, 67, 204; 219/69.12; 125/21; 82/1.2, 1.11; 425/289, 263–268; 264/154, 155, 239, 264/310; 13/5, 56
 See application file for complete search history.

(56) References Cited

U.S. PATENT DOCUMENTS

| | | | | | |
|---|---|---|---|---|---|
| 1,864,921 | A | * | 6/1932 | Mayer | 83/200.1 |
| 2,182,656 | A | * | 12/1939 | Bruggimann | 83/155 |
| 3,162,255 | A | * | 12/1964 | McCarty | 175/213 |
| 4,125,047 | A | * | 11/1978 | Martin | 83/581.1 |
| 4,333,000 | A | * | 6/1982 | Shimizu | 219/69.12 |
| 4,484,502 | A | * | 11/1984 | Ebner | 83/651.1 |
| 4,699,032 | A | * | 10/1987 | Clark, III | 83/171 |
| 4,915,000 | A | * | 4/1990 | MacFarlane | 83/651.1 |
| 5,573,350 | A | * | 11/1996 | Stegall | 405/119 |
| 5,730,235 | A | * | 3/1998 | Koenig | 175/230 |
| 5,942,261 | A | * | 8/1999 | Dreith | 425/458 |
| 5,966,794 | A | | 10/1999 | Ishizaka et al. | |
| 6,424,812 | B1 | * | 7/2002 | Hsu | 399/262 |
| 6,722,042 | B1 | * | 4/2004 | Naville et al. | 30/280 |
| 8,127,444 | B2 | * | 3/2012 | Bladon et al. | 29/889.23 |
| 8,950,300 | B2 | * | 2/2015 | Ebihara et al. | 82/1.5 |
| 2004/0134317 | A1 | * | 7/2004 | Clay | B23B 5/40 82/1.11 |
| 2006/0278057 | A1 | * | 12/2006 | Wuertemberger | 83/651.1 |
| 2009/0062802 | A1 | * | 3/2009 | Palmer et al. | 606/79 |
| 2012/0227896 | A1 | * | 9/2012 | Clabunde | 156/193 |
| 2013/0333534 | A1 | * | 12/2013 | Votolato | 83/13 |
| 2014/0259699 | A1 | * | 9/2014 | Yang | 30/380 |
| 2015/0027284 | A1 | * | 1/2015 | Cheng et al. | 83/23 |
| 2015/0101471 | A1 | * | 4/2015 | Pierce et al. | 83/522.14 |
| 2015/0239140 | A1 | * | 8/2015 | Majestic | B26D 7/086 264/433 |

FOREIGN PATENT DOCUMENTS

| | | |
|---|---|---|
| JP | 11-70522 A | 3/1999 |
| JP | 11-71195 A | 3/1999 |

OTHER PUBLICATIONS

Web search history, 1 page.*
Video: Making a mosaic basin part 1—Clay Craft Malaysia—https://youtu.be/Y0NROV1bhfE, uploaded Nov. 30, 2011.*
Video: How to Make a Pottery Tea Set: Pottery: Trimming Tea Cups—https://youtu.be/m8fpHXChDUI, uploaded Oct. 3, 2008.*
International Search Report for PCT/JP2011/051856, mailing date of Apr. 19, 2011.

* cited by examiner

US 9,630,262 B2

METHOD OF MANUFACTURING MEMBER HAVING CLOSED-BOTTOM HOLE PORTION, AND WORKING TOOL

TECHNICAL FIELD

The present invention relates to a method of manufacturing a member having a closed-bottom hole portion that is used for a carbonaceous crucible, by hollowing out a material made of a carbonaceous material. The invention also relates to a working tool used for the manufacturing method.

BACKGROUND ART

A member having a closed-bottom hole portion that is used for a carbonaceous crucible has been manufactured by hollowing out an inner portion of a raw material made of a carbonaceous material using a working tool (see Patent Document 1 below). The manufacturing method described in Patent Document 1 is as follows. A raw material made of a carbonaceous material is rotated, and a groove digging tool is pressed against an end face of the raw material to dig the material, so as to form a cylindrical trench in which a saw blade can be inserted, whereby a hollowed-out side portion is formed. Next, the groove digging tool removed, and a tool having a saw blade mounted to its distal end is inserted in the cylindrical trench. This tool for forming a hollowed-out bottom portion supports the saw blade at one point of the distal end, and it is configured so that the saw blade can be rotated around the support point. Then, after inserting the saw blade into the bottom of the cylindrical trench, the saw blade is rotated to cut the raw material by pressing the saw blade in a direction approaching the central portion of the raw material, so that the hollowed-out bottom portion is formed.

CITATION LIST

Patent Literature

[Patent Document 1] Japanese Published Unexamined Utility Model Application No. H01-117814

SUMMARY OF INVENTION

Technical Problem

The above-described conventional technique uses a saw blade, so the cylindrical trench needs to be wide so that the saw blade can be inserted therein. Consequently, the production yield of the material is not good. In addition, since the saw blade has a one-point support structure, excessive stress acts on the one-point support portion of the saw blade during cutting, so deformation and breakage tend to occur easily, leading to durability problems. Moreover, since the saw blade has the one-point support structure, the force required for rotating the saw blade tends to be large.

The present invention has been accomplished in view of the foregoing circumstances. It is an object of the invention to provide a method of manufacturing, and a working tool for, a member having a closed-bottom hole portion that can achieve a good yield of the material, can improve the durability of the cutting blade, and can reduce the force required for the work, by forming a hollowed-out bottom portion using a cutting wire having a two-point support.

Solution to Problem

In order to accomplish the foregoing objects, the present invention provides a method of manufacturing a member having a closed-bottom hole portion by inside-removing-working a raw material made of a carbonaceous material, the closed-bottom hole portion having a hollowed-out side portion and a hollowed-out bottom portion formed by hollowing out an inner portion of the raw material, including: a step of forming a cylindrical trench by digging the raw material frontward from a near-side end face of raw material while rotating the raw material, to form the hollowed-out side portion; and a step of forming the hollowed-out bottom portion by supporting a cutting wire inserted into a bottom portion of the cylindrical trench at two points while rotating the raw material, and pressing the cutting wire being supported at the two points in a direction approaching an axis line of the raw material.

The term "a cutting wire inserted in a bottom portion of the cylindrical trench" means both a case in which the cutting wire is inserted in the bottom portion of the cylindrical trench at the same time of forming the cylindrical trench and a case in which the cutting wire is inserted in the bottom portion of the cylindrical trench after forming the cylindrical trench. In the former case, a cutting blade for digging the cylindrical trench is provided at a distal end portion, and the cylindrical trench and the hollowed-out bottom portion are formed using a cylindrically-shaped tool equipped with a cutting wire having a two-point support structure. The latter case may be as follows. The cylindrical trench is formed using a tool equipped with a cutting blade for digging the cylindrical trench. After the formation of the cylindrical trench, the tool is removed, and a cylindrical tool having a cutting wire at its distal end is inserted in the cylindrical trench to form the hollowed-out bottom portion with the cutting wire.

The term "member having a closed-bottom hole portion" is not limited to a closed-bottom cylindrical member, but it means to broadly include members that have a hole portion and the outer shape of which is, for example, in a rectangular parallelepiped shape or in a conical shape.

The following advantageous effects are obtained by forming the hollowed-out bottom portion using a cutting wire supported by two points in the manner as described above.

(1) The cutting wire has a considerably smaller width than the saw blade as used in the conventional example. Therefore, the necessary width of the cylindrical trench can be made remarkably smaller than that in the conventional example, so the yield of the material can be improved.

(2) The cutting wire is supported by two points. Accordingly, the stress acting on the cutting wire is distributed between the support parts when cutting, and therefore, excessive stress that acts on the support parts can be prevented in comparison with the conventional example of the one-point support structure. As a result, the cutting wire is prevented from the breakage resulting from stress concentration, and the durability can be improved.

(3) Moreover, in comparison with the cutting blade (saw blade) with a one-point support structure as in the conventional example, the cutting blade can be pressed against the raw material without difficulty in the case of the cutting blade (cutting wire) with a two-point support structure as in the present invention. Therefore, it becomes possible to carry out the cutting work with a smaller load to the apparatus than in the case of the conventional example.

In the present invention, the method may further comprise: preparing a working tool in advance, the working tool comprising a cylindrical main unit having a cutting blade provided at a distal end portion thereof for digging a cylindrical trench and a cutting wire supported by two points; and performing the step of forming cylindrical trench and the step of forming the hollowed-out bottom portion successively using the working tool. Unlike the conventional example, the replacement of cutting tools, in which a cutting tool for forming the cylindrical trench formation is removed after the formation of the cylindrical trench and a cutting tool for forming the hollowed-out bottom is inserted in the cylindrical trench, is unnecessary. Therefore, the workability is improved remarkably.

In the present invention, it is preferable that: the cylindrical main unit comprise an outer cylindrical body and an inner cylindrical body, the outer cylindrical body and the inner cylindrical body being disposed so as to be overlapped concentrically; one end of the cutting wire be fitted to one of the outer cylindrical body and the inner cylindrical body; the other end of the cutting wire be fitted to the other one of the outer cylindrical body and the inner cylindrical body; and, by rotating at least one of the outer cylindrical body and the inner cylindrical body relatively to each other, the cutting wire be displaced in a direction approaching an axis line of the raw material to form the hollowed-out bottom portion.

In the present invention, the method may further comprise, in the step of forming the cylindrical trench and/or in the step of forming the hollowed-out bottom portion, a dust discharging step of collecting chips produced by cutting the raw material and discharging the chips to outside. This can prevent the chips from scattering over the working region by collecting the chips produced during the cutting and discharging the chips to outside. In addition, it is possible to prevent the chips from remaining the region in the vicinity of the cutting surface. Thus, it is possible to prevent the cutting accuracy from degrading and make the cutting work smoother.

In addition, in order to accomplish the foregoing object, the present invention may also provide the following working tool used for a method of manufacturing a member having a closed-bottom hole portion. Specifically, the present invention also provides a working tool used for manufacturing a member having a closed-bottom hole portion by hollowing out a raw material made of a carbonaceous material, comprising: a cylindrical main unit; a cutting wire disposed at a distal end portion of the cylindrical main unit within a plane substantially perpendicular to an axis line of the cylindrical main unit, the cutting wire being supported by two points and being displaceable in directions approaching and moving away from the axis line of the cylindrical main unit; and an operating means for performing a displacement operation of the cutting wire, wherein, in a normal state, the cutting wire is disposed in an arc shape along a distal end face of the cylindrical main unit, and when cutting with the cutting wire, the cutting wire is displaced in the direction approaching the axis line of the cylindrical main unit by an operation by the operating means.

With the use of the working tool having the just-described configuration, a member having a closed-bottom hole portion can be manufactured by inside-removing-working a raw material made of a carbonaceous material, the closed-bottom hole portion having a hollowed-out side portion and a hollowed-out bottom portion formed by hollowing out an inner portion of the raw material. Moreover, because the cutting wire is used as the cutting blade for forming the hollowed-out bottom portion, the necessary width of the cylindrical trench can be made remarkably smaller than that in the conventional example, so the yield of the material can be improved. Furthermore, since the cutting wire is supported by two points, the stress acting on the cutting wire is distributed between the support parts when cutting, and therefore, excessive stress that acts on the support parts can be prevented in comparison with the conventional example of the one-point support structure. As a result, the cutting wire is prevented from the breakage resulting from stress concentration, and the durability can be improved. In addition, in comparison with the one-point support structure as in the conventional example, the cutting blade (cutting wire) can be pressed against the raw material without difficulty in the case of the two-point support structure. Therefore, it becomes possible to carry out the cutting work with a smaller load to the apparatus than in the case of the conventional example.

In the working tool according to the present invention, it is possible that: a support part for supporting one end of the cutting wire is fixed; another support part for supporting the other end thereof is allowed to move in a circumferential direction of the cylindrical main unit; and by moving the other support part for supporting the other end in the circumferential direction, the cutting wire rotates about the one end being a rotation support axis so that the cutting wire is displaced in the direction approaching the axis line of the cylindrical main unit.

The working tool according to the present invention may preferably further comprise a tip-shaped cutting blade provided on a distal end face of the cylindrical main unit, the tip-shaped cutting blade protruding further toward a distal end side than the cutting wire. When using the just-described working tool, the replacement of cutting tools, in which a cutting tool for forming the cylindrical trench formation is removed after the formation of the cylindrical trench and a cutting tool for forming the hollowed-out bottom is inserted in the cylindrical trench, is unnecessary, unlike the conventional example. Therefore, the workability is improved remarkably.

In the working tool according to the present invention, it may be possible that: the cylindrical main unit comprises an inner cylindrical body and an outer cylindrical body that are superposed with each other; one end of the cutting wire is fitted to either one of the inner cylindrical body and the outer cylindrical body; the other end of the cutting wire is fitted to the other one of the inner cylindrical body and the outer cylindrical body; and by rotating either one of the inner cylindrical body and the outer cylindrical body in a circumferential direction, the cutting wire is allowed to be displaced in directions approaching and moving away from the axis line of the cylindrical main unit.

When the cylindrical main unit comprises two cylindrical bodies as in the just-described configuration, there is an advantage that the portion of the raw material that is lost as chips can be made smaller by making the thickness of each of the cylindrical bodies smaller, in comparison with the case in which the cylindrical main unit has only one cylindrical body.

The working tool according to the present invention may preferably further comprise a dust collection means at a base end side of the inner cylindrical body. This makes it possible to collect the chips produced during the cutting and discharge them to outside.

More preferably, the working tool may further comprise: an air injection groove formed in either one of an outer surface of the inner cylindrical body and an inner surface of the outer cylindrical body and extending from the base end side of the working tool to a distal end side thereof; and an air injection tube communicating with the air injection groove. Sending the air to the distal end of the working tool enables the dust collection to be more effective.

Advantageous Effects of Invention

The present invention exhibits the following advantageous effects.

(1) The cutting wire has a considerably smaller width than a saw blade. Therefore, the necessary width of the cylindrical trench can be made remarkably smaller than that in the conventional example, so the yield of the material can be improved.

(2) The cutting wire is supported by two points. Accordingly, the stress acting on the cutting wire is distributed between the support parts when cutting, so the support parts can be prevented from excessive stress in comparison with the conventional examples of the one-point support structure. As a result, the cutting wire is prevented from the breakage resulting from stress concentration, and the durability can be improved.

(3) Moreover, in comparison with the cutting blade (saw blade) with a one-point support structure as in the conventional example, the cutting blade can be pressed against the raw material without difficulty in the case of the cutting blade (cutting wire) with a two-point support structure as in the present invention. Therefore, it becomes possible to carry out the cutting work with a smaller load to the apparatus than in the case of the conventional example.

DESCRIPTION OF EMBODIMENTS

Hereinbelow, the present invention will be described based on the preferred embodiments. It should be noted that the present invention is not limited to the following embodiments. In the following embodiment, a method of manufacturing a closed-bottom cylindrical member and a working tool therefor are illustrated as an example of the method of manufacturing a member having a closed-bottom hole portion and an example of the working tool.

Figure 1:
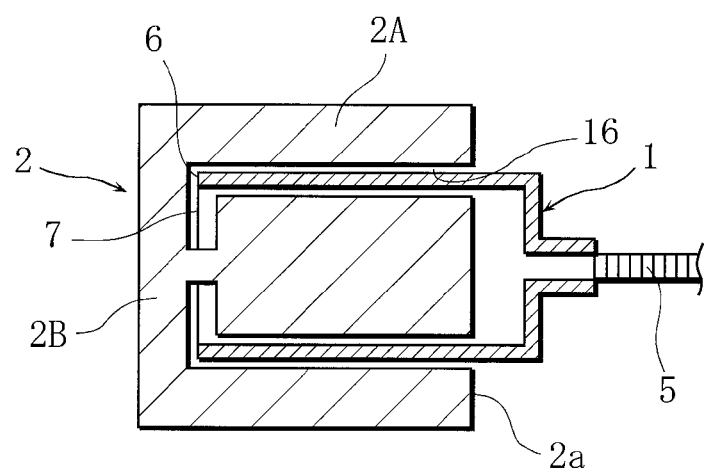
FIG. 1 is a cross-sectional view schematically showing the condition in which the working tool according to an embodiment is used.

FIGS. 1 through 16 show an embodiment of the present invention. With reference to these drawings, an embodiment of the present invention will be described. As illustrated in FIG. 1, a working tool 1 according to the present invention is an inside-removing work tool used for manufacturing a closed-bottom cylindrical member (which is equivalent to the member having a closed-bottom hole portion) having a hollowed-out side portion 2A and a hollowed-out bottom portion 2B formed by inside-removing-working a columnar raw material 2 (hereinafter referred to as a "work") made of a carbonaceous material and hollowing out an inner portion of the work 2.

Figure 2:
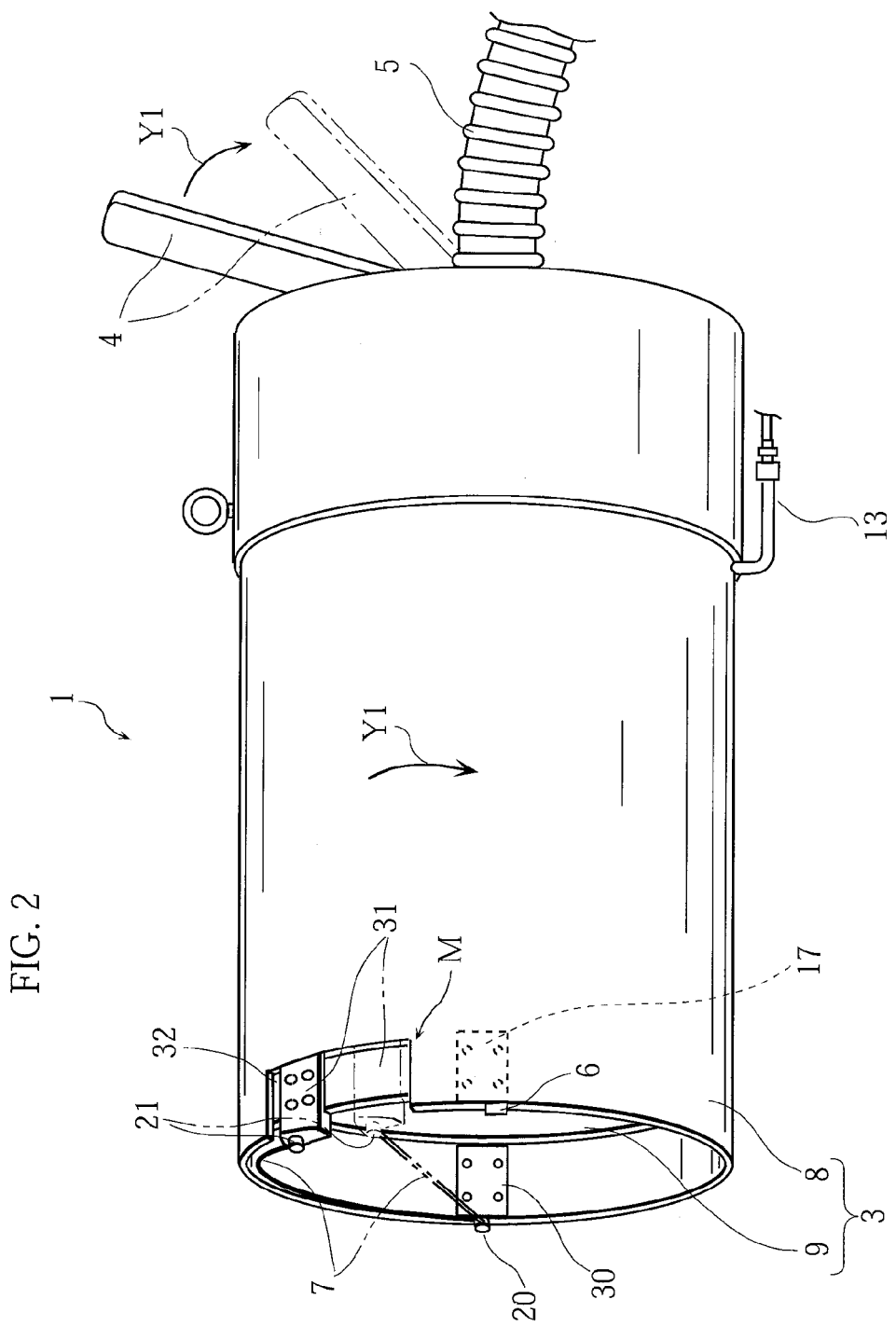
FIG. 2 is a perspective view of the working tool according to the embodiment.
Figure 3:
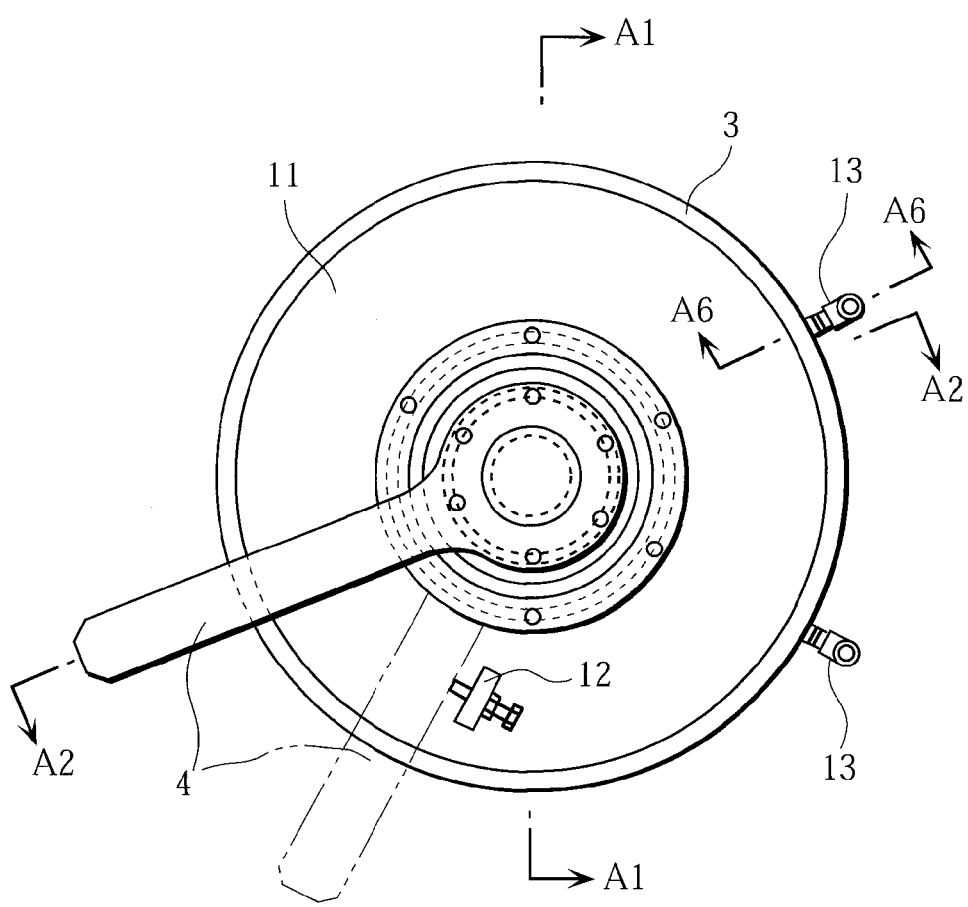
FIG. 3 is a right side view of the working tool according to the embodiment.

As illustrated in FIG. 2, the working tool 1 has a cylindrical main unit 3, an operation lever 4 provided on the base end side of the cylindrical main unit 3, and a dust collection hose 5 for collecting the chips produced when cutting the work 2 and discharging the chips to outside. The dust collection hose 5 is connected to a suction apparatus (not shown) such as a blower. A tip-shaped cutting blade 6 and a cutting wire 7 are provided at the distal end face of the cylindrical main unit 3. The tip-shaped cutting blade 6 is formed of ultra-hard particles such as diamond or an ultra-hard alloy such as tungsten carbide. The cutting wire 7 is configured by electrodepositing an ultra-hard metal or diamond particles on the surface of an elemental wire such as piano wire. When the diameter of the elemental wire such as piano wire is made as smaller as possible, the amount of the portion of the raw material that is turned into chips can be made less. However, it is preferable that the diameter of the elemental wire be about 1-2 mm in order to ensure sufficient strength.

Figure 5:
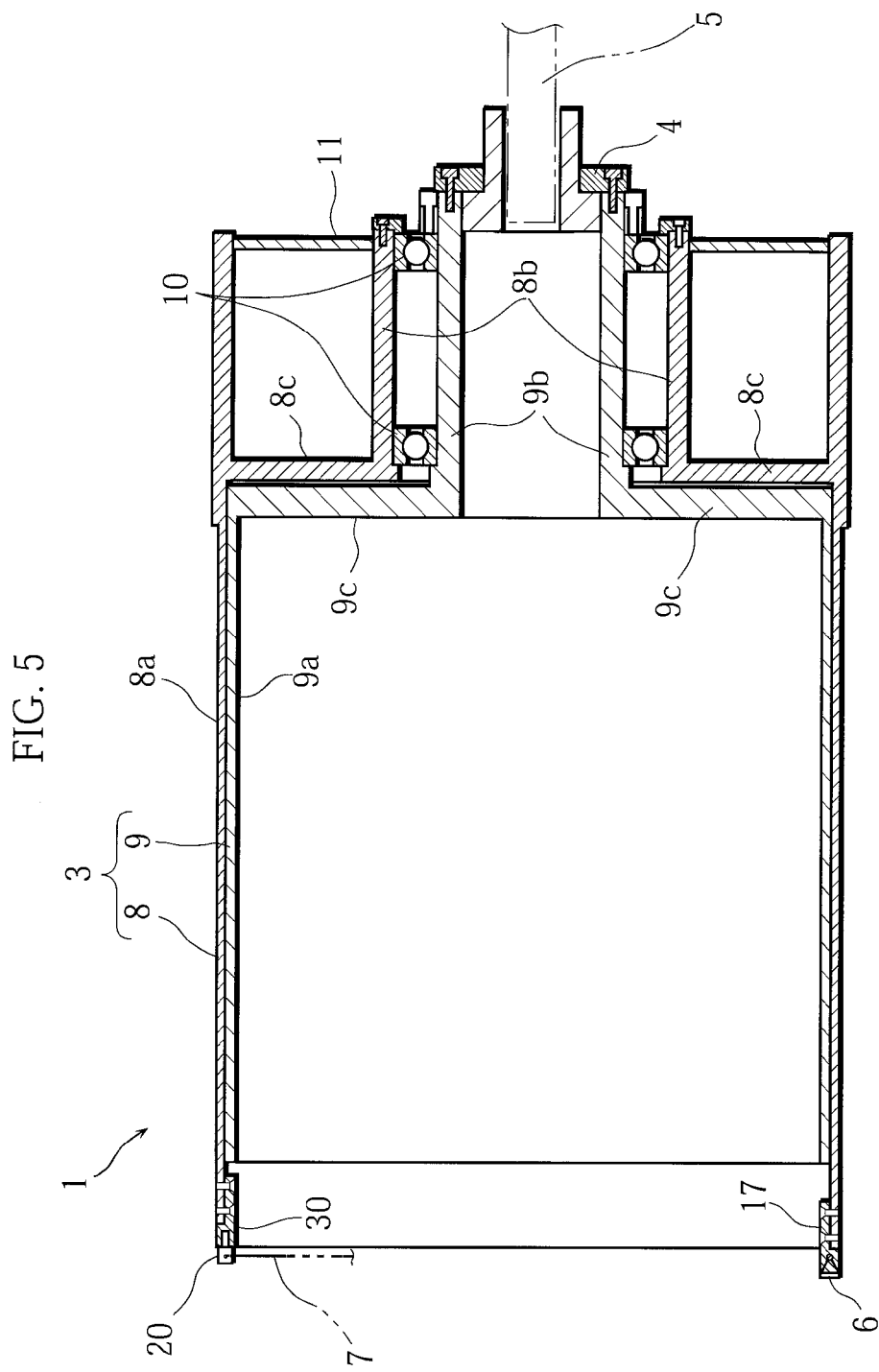
FIG. 5 is a cross-sectional view taken along line A1-A1 in FIG. 3.
Figure 6:
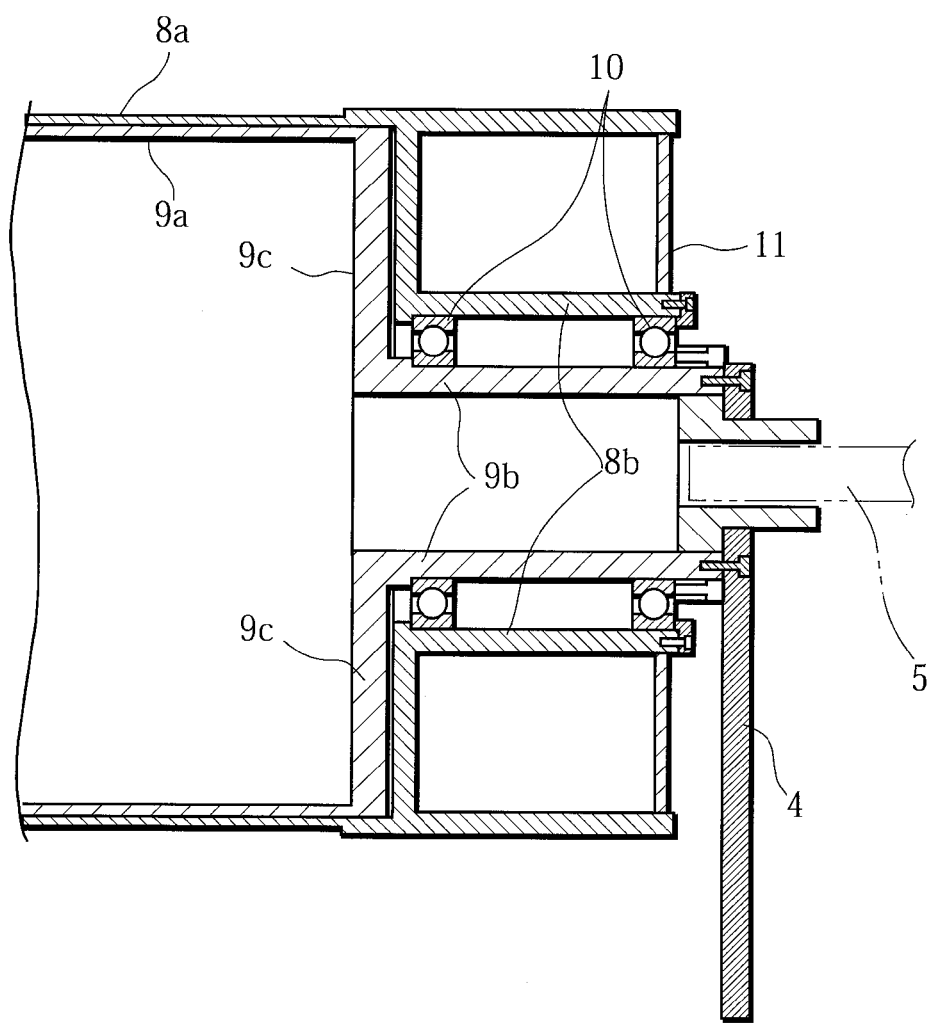
FIG. 6 is a cross-sectional view taken along line A2-A2 in FIG. 3.
Figure 7:
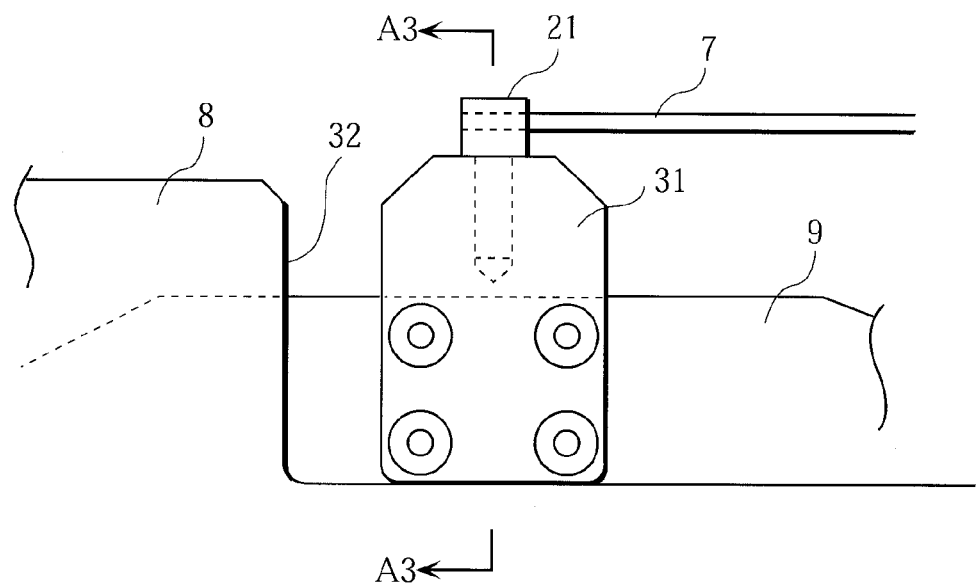
FIG. 7 is a front view showing a portion near a movable support part for a cutting wire, viewed in the direction indicated by arrow X1 in FIG. 4.

The cylindrical main unit 3 has, as illustrated in FIG. 5, an outer cylindrical body 8 and an inner cylindrical body 9 rotatable relative to the outer cylindrical body 8. The outer cylindrical body 8 and the inner cylindrical body 9 are disposed so as to be overlapped concentrically. The inner cylindrical body 9 is rotatably supported by a bearing 10 at the base end side, and it is allowed to be rotatable relative to the outer cylindrical body 8 by an operation with the operation lever 4. By rotatably supporting the inner cylindrical body 9 by the bearing 10 in this manner, the inner cylindrical body 9 can be rotated smoothly by, for example, human power. An end cover 11 is fitted to the end face on the base end side of the cylindrical main unit 3, and a stopper 12 (see FIG. 3) for inhibiting rotation of the operation lever 4 is provided on the end cover 11.

Figure 13:
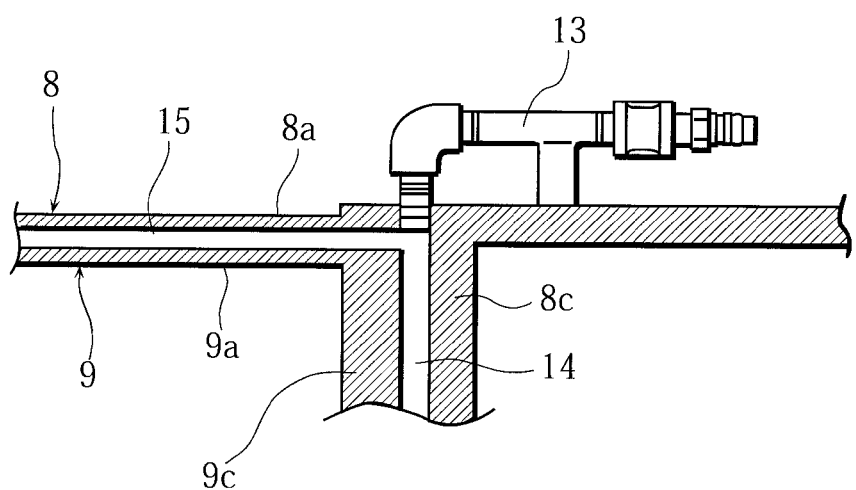
FIG. 13 is a cross-sectional view taken along line A6-A6 in FIG. 3.

As illustrated in FIG. 5, the outer cylindrical body 8 has a larger diameter portion 8a, a smaller diameter portion 8b, and a joint portion 8c for connecting the larger diameter portion 8a and the smaller diameter portion 8b. The inner cylindrical body 9 has a larger diameter portion 9a, a smaller diameter portion 9b, and a joint portion 9c for connecting the larger diameter portion 9a and the smaller diameter portion 9b. An air injection tube 13 (see FIGS. 2 and 3) is provided on the outer surface of the outer cylindrical body 8 and near the boundary where the outer cylindrical body changes from the larger diameter portion into a smaller diameter. As illustrated in FIG. 13, the air injection tube 13 is arranged facing a space 14 between the joint portion 8c and the joint portion 9c. The space 14 communicates with an air injection groove 15 formed in the inner surface of the outer cylindrical body 8. The air injection groove 15 extends from the base end side to the distal end side of the working tool. When air is injected through the air injection tube 13, the injected air is sent from the space 14 through the air injection groove 15 to the distal end side of the working tool. This, in addition to the suction effect from the dust collection hose 5, allows the chips produced during the cutting to be discharged to outside smoothly through the dust collection hose 5. The air injection groove 15 may be formed in the outer surface of the inner cylindrical body 9.

Figure 8:
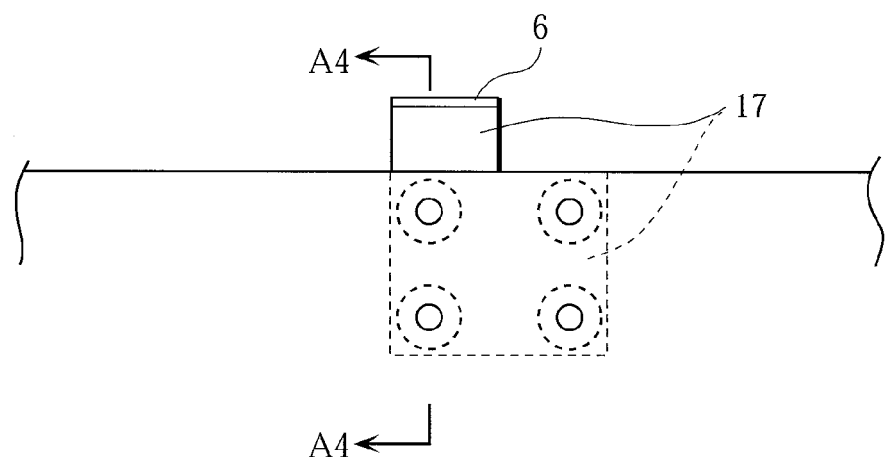
FIG. 8 is a front view showing a portion near a chip-shaped cutting blade, viewed in the direction indicated by arrow X2 in FIG. 4.
Figure 9:
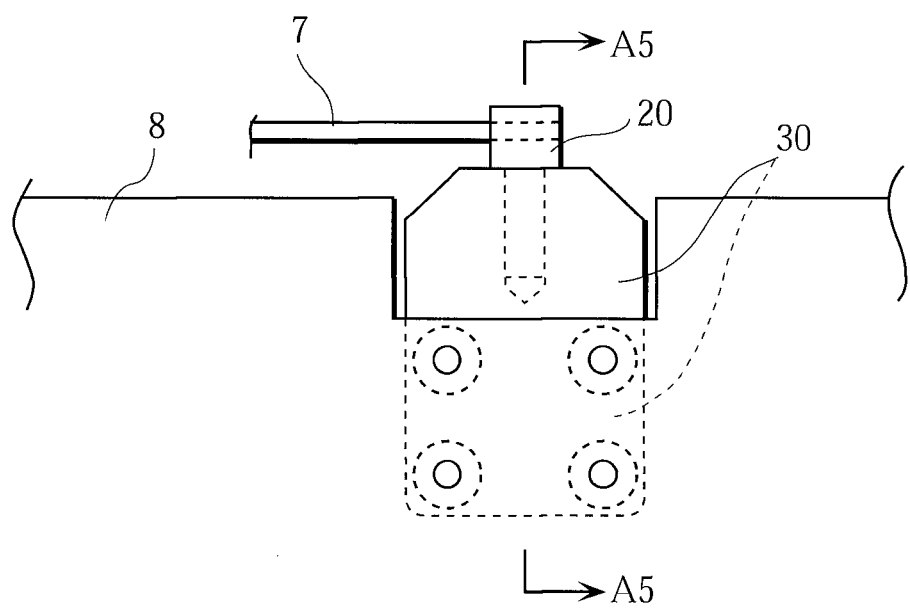
FIG. 9 is a front view showing a portion near a stationary support part for a cutting wire, viewed in the direction indicated by arrow X3 in FIG. 4.
Figure 10:
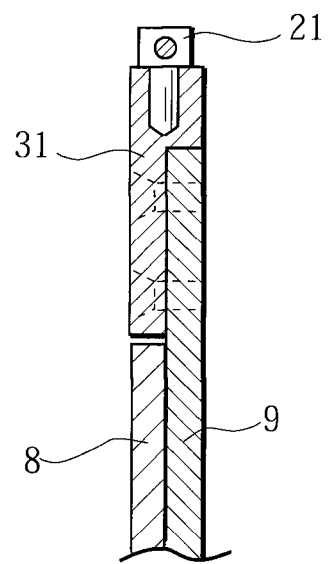
FIG. 10 is a cross-sectional view taken along line A3-A3 in FIG. 7.
Figure 11:
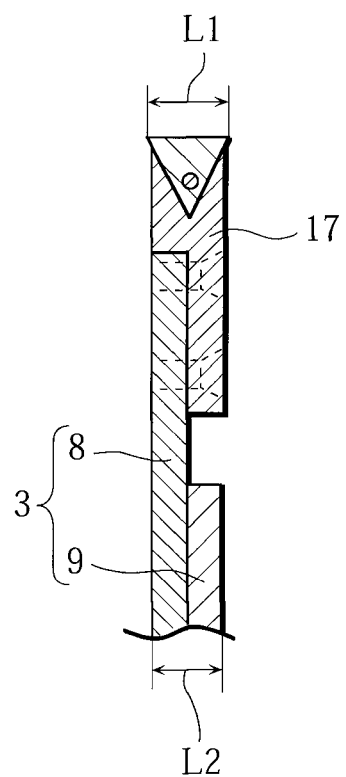
FIG. 11 is a cross-sectional view taken along line A4-A4 in FIG. 8.
Figure 12:
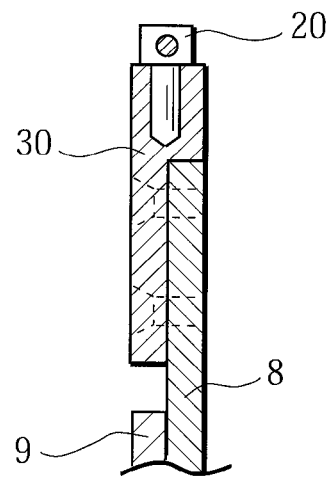
FIG. 12 is a cross-sectional view taken along line A5-A5 in FIG. 9.

As illustrated in FIG. 2, the tip-shaped cutting blade 6 is provided at the distal end of the outer cylindrical body 8. The cutting blade 6 is fitted so as to protrude slightly (for example, about 2 mm) from the distal end of the outer cylindrical body 8 so that when processing the work 2 by pressing the working tool 1 against the main surface 2a of the rotating work 2 (see FIGS. 1 and 15(1)), the cutting blade 6 comes into contact with the work 2 first. As illustrated in FIG. 11, the cutting blade 6 has a cross section in inverted triangular shape, and the thickness L2 thereof is set to be slightly wider than the thickness L2 of the cylindrical main unit 3. This enables the outer cylindrical body 8 and the inner cylindrical body 9 to be inserted in a cylindrical trench 16 (see FIG. 1) cut by the cutting blade 6. Note that as illustrated in FIGS. 8 and 11, the cutting blade 6 is fixed to the distal end face of a fastening metal fixture 17, and the fastening metal fixture 17 is fitted to the inner surface of the outer cylindrical body 8. It is preferable that the cutting blade 6 be disposed so as to slightly protrude inward of the outer cylindrical body 8.

As illustrated in FIG. 2, the cutting wire 7 is disposed within a plane substantially perpendicular to the axis line the cylindrical main unit 3. In such a condition, one end of the cutting wire 7 is supported by and fixed to a columnar support part 20 of the outer cylindrical body 8, while the other end of the cutting wire 7 is supported by and fixed to a columnar support part 21 of the inner cylindrical body 9. In other words, while the cutting wire 7 is disposed at the distal end of the cylindrical main unit 3 within a plane substantially perpendicular to the axis line of the cylindrical main unit 3, both of the ends of the cutting wire 7 are supported (two-point supported). It should be noted that since the inner cylindrical body 9 is rotatable, the support part 21 also rotates due to the rotation of the inner cylindrical body 9. Thus, the support part 21 is a movable support part (hereinafter, the support part 21 may be referred to as the "movable support part 21"). On the other hand, the outer cylindrical body 8 is non-rotatable, so the support part 20 is a stationary support part that remains at a fixed position at all times (hereinafter, the support part 20 may be referred to as the "stationary support part 20"). By an operation of the operation lever 4, the inner cylindrical body 9 is rotated, and thereby, the movable support part 21 moves in a circumferential direction of the inner cylindrical body 9. Thereby, the cutting wire 7 rotates about the support part 20, and is displaceable in directions approaching and moving away from the axis line of the cylindrical main unit 3. Note that except when forming the hollowed-out bottom portion 2B, the cutting wire 7 is in an arc shape along the distal end face of the outer cylindrical body 8.

The support part 20 for the cutting wire 7 is fitted rotatably to a fastening metal fixture 30 (see FIG. 2), and the support part 21 for the cutting wire 7 is fitted rotatably to a fastening metal fixture 31 (see FIG. 2). Such a structure permits the support parts 20 and 21 to rotate corresponding to the displacement of the cutting wire 7 when moving the support part 21. Therefore, the cutting wire 7 is allowed to rotate smoothly without causing undulation. Also, as will be described later, the cutting wire 7 is allowed to return in the original arrangement condition, along an arc shape, after finishing the cutting.

In addition, a portion of the outer cylindrical body 8 is cut away to form a cut-away portion 32 (see FIG. 2), and the fastening metal fixture 31 is fastened to the outer surface of the inner cylindrical body 9, which is exposed by the cut-away portion 32. The movable support part 21 is allowed to be slidable within a circumferential length K (see FIG. 4) of the cut-away portion 32.

Figure 4:
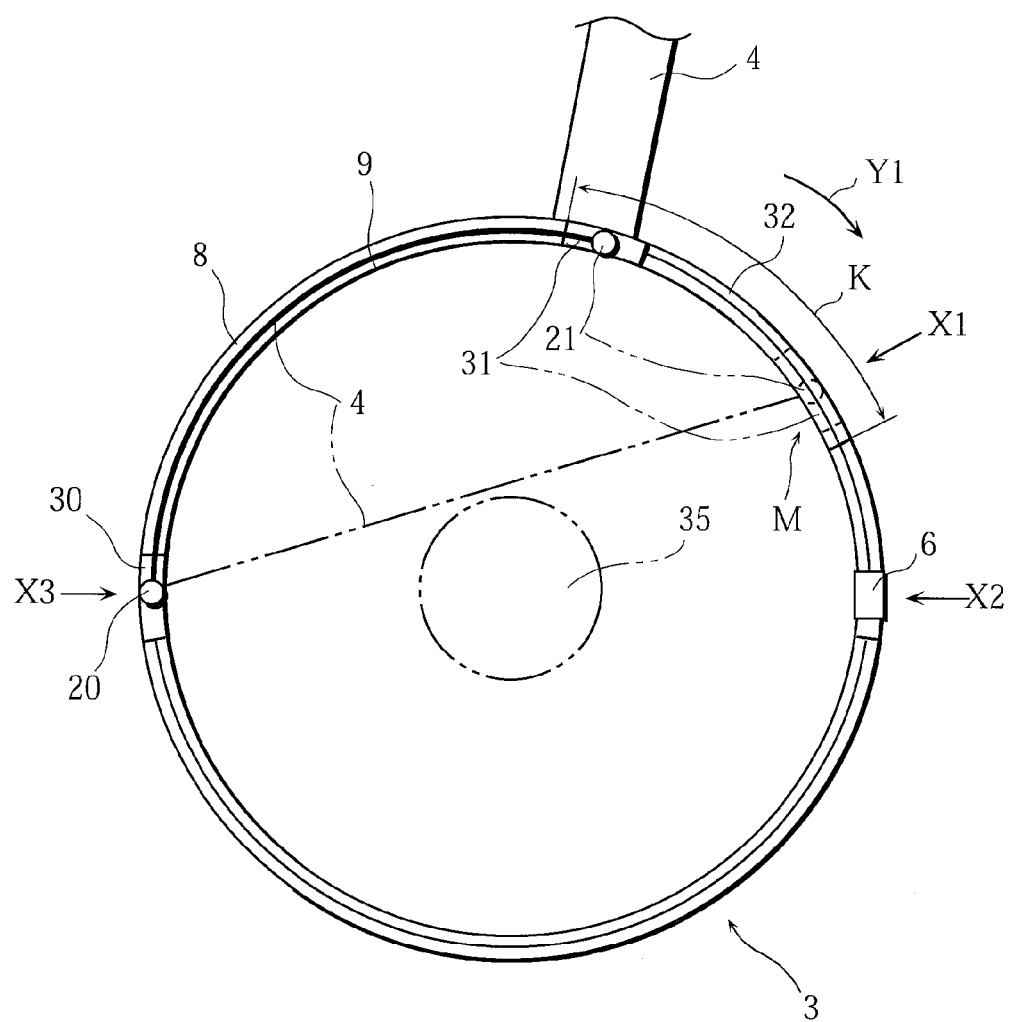
FIG. 4 is a left side view of the working tool according to the embodiment.

As illustrated in FIG. 4, when the operation lever 4 is rotated in the arrow's direction Y1, the movable support part 21 rotates in the arrow's direction Y1 along the circumferential direction, and the cutting wire 7 rotates about the support part 20 as the center of rotation. As a result, the cutting wire 7 can be displaced in a direction approaching the axis line of the cylindrical main unit 3. By this displacement operation of the cutting wire 7, a bottom portion of the work 2 is cut, as will be described later. Then, in the condition in which the operation lever 4 makes contact with the stopper 12 so as to be blocked from rotating, the movable support part 21 reaches a maximum movable position M indicated by virtual line. Since the movable support part 21 cannot move in the approaching direction beyond the maximum movable position M, a circular portion with a predetermined size remains at a central portion of the work 2. The diameter of this circular remaining portion 35 is set at, for example, about 120 mm. That is, not the entire hollowed-out bottom portion 2B is cut away, but the work is cut in such a condition that a predetermined region of a central portion of the work's bottom portion is left (for example, the circular remaining portion 35 having a diameter of 120 mm is left).

As illustrated in FIG. 4, the cutting wire 7 is set so that it is stretched in a straight line when the movable support part 21 reaches the maximum movable position M. It is preferable that the tension of the cutting wire 7 is set so that the cutting wire 7 is just about to be stretched in a straight line at the maximum movable position M. The reason is as follows. If the cutting wire 7 is stretched in a straight line, the cutting wire 7 may change it shape so as to protrude toward the axis line of the cylindrical main unit 3 when it is returned to the original condition. If such a change in shape occurs, the arrangement in an arc shape along the outer cylindrical body 8 cannot be obtained. In other words, by stopping the cutting wire 7 so as to be just about to be stretched in a straight line at the maximum movable position M, the cutting wire 7 inevitably changes its shape so as to protrude toward the opposite side to the axis line side of the cylindrical main unit 3 when the cutting wire 7 is returned to the original state. Therefore, the cutting wire 7 can smoothly return the original arc shape condition along the outer cylindrical body 8.

Next, the fitting conditions of the tip-shaped the cutting blade 6 and the cutting wire 7 will be described in detail. The fastening metal fixture 17 is fixed to the inner surface of the outer cylindrical body 8, the fastening metal fixture 30 is fixed to the inner surface of the outer cylindrical body 8, and the fastening metal fixture 31 is fixed to the outer surface of the inner cylindrical body 9. The use of these fastening metal fixtures 17, 30, and 31 allows the thickness of the fitting portions on the tip-shaped the cutting blade 6 and the cutting wire 7 to be greater, ensuring greater fitting strength to the cylindrical main unit.

Figure 14:
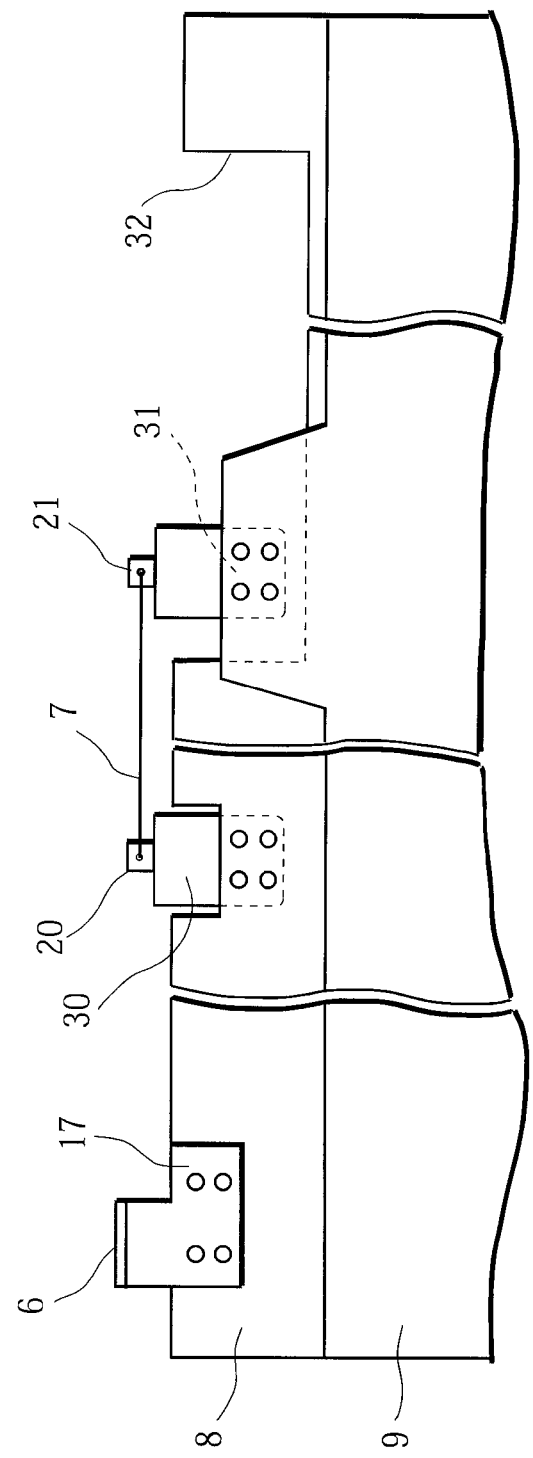
FIG. 14 is a circumferential development view showing a cylindrical main unit.

In addition, portions of the outer cylindrical body 8 and the inner cylindrical body 9 are extended to the distal end of the working tool 1 while the rest of the portions are provided to a middle point near the distal end so that the fitting portions of the support parts 20 and 21 and the tip-shaped the cutting blade 6 do not interfere with each other. Specifically, as illustrated in FIG. 14, a portion of the inner cylindrical body 9 that is near the fitting portion with the movable support part 21 is extended to the distal end, but the rest of the portion is configured to have a length to a middle point near the distal end. As described above, the fastening metal fixture 31 for the movable support part 21 is fixed to the outer surface of the inner cylindrical body 9 that is exposed by the cut-away portion 32. This inhibits the fastening metal fixture from interfering with the outer cylindrical body 9 when moving the movable support part 21. In addition, the thickness of the fastening metal fixtures 17, 30, and 31 is set smaller than the thickness of the tip-shaped the cutting blade 6. The reason is that if the thickness of the fastening metal fixtures 17, 30, and 31 is greater than the thickness of the tip-shaped the cutting blade 6, the fastening metal fixtures 17, 30, and 31 are caught in the cylindrical trench 16 formed by the tip-shaped the cutting blade 6, and the working tool 1 cannot be pushed into the raw material. It should be noted that the distal end face of the tip-shaped cutting blade 6 protrudes further toward the distal end side than the cutting wire 7. Furthermore, the distal end face of the tip-shaped cutting blade 6 protrudes further toward the distal end side than the distal end face of the support part. That is, the working tool 1 is configured so that the tip-shaped the cutting blade 6 is provided at the most distal end of the working tool 1.

Figure 15:
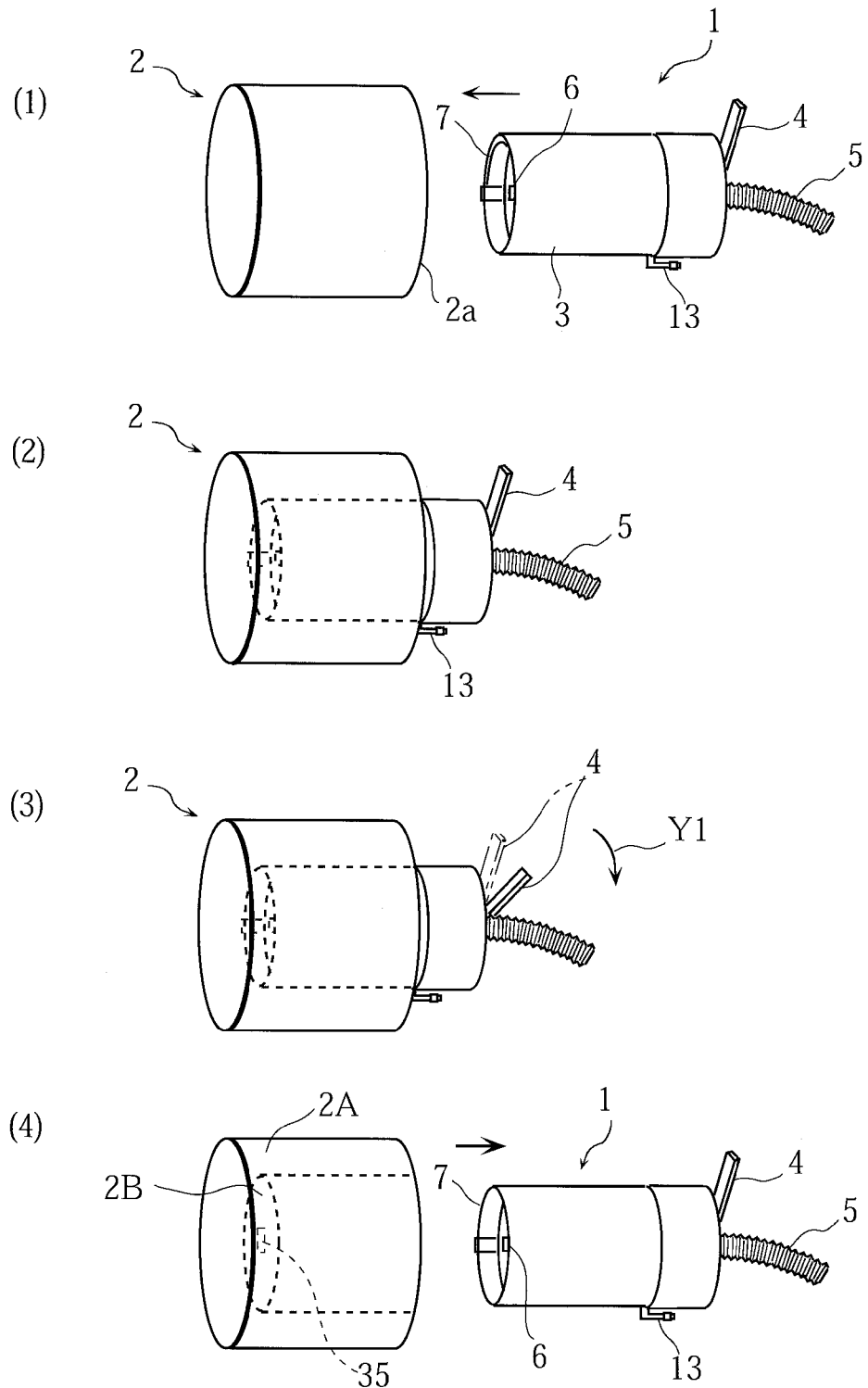
FIG. 15 is a view showing a cutting procedure of cutting a work using a working tool.
Figure 16:
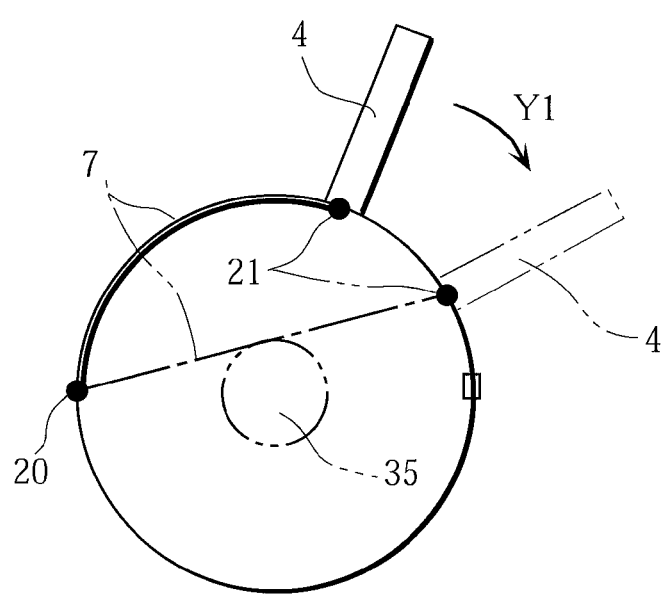
FIG. 16 is a view showing how an operation lever is operated when cutting a work using a working tool.

Next, with reference to FIGS. 15 and 16, the following describes a method of manufacturing a closed-bottom cylindrical member having a hollowed-out side portion 2A and a hollowed-out bottom portion 2B by inside-removing-working the work 2 using the working tool 1 having the above-described structure to hollow out an inner portion of the work 2.

First, as illustrated in FIG. 15(1), the work 2 and the working tool 1 are mounted to a predetermined position of a lathe (not shown).

Next, as illustrated in FIG. 15(2), the work 2 is rotated, and the working tool 1 is pressed against a main surface 2a of the work 2 that is being rotated. Thereby, the cutting blade 6 provided at the distal end of the working tool 1 makes contact with the main surface 2a of the work 2, and the work 2 is cut. As the working tool 1 is pressed toward the distal end side, the cylindrical main unit 3 is gradually inserted in the cylindrical trench 16 cut by the cutting blade 6, and the hollowed-out side portion 2A is gradually formed in the work 2. When forming the cylindrical trench 16, the cutting wire 7 is retained along the circumference of the outer cylindrical body 8 and the inner cylindrical body 9, and the stationary support part 20 and the movable support part 21 protrude toward the distal end and also have a certain width, thereby enabling the cutting wire 7 to proceed within the cylindrical trench 16 without making contact with the work 2.

Next, when the work is dug to a predetermined depth, pressing of the working tool 1 is stopped, and as illustrated in FIGS. 15(3) and 16, the operation lever 4 is operated in the arrow's direction Y1 to cause the inner cylindrical body 9 to rotate in a circumferential direction. By rotating the inner cylindrical body 9, the cutting wire 7 is gradually pressed in the direction approaching the axis line of the work 2. Thereby, the bottom portion of the work 2 is cut away, and the hollowed-out bottom portion 2B is gradually formed in the work 2. When the operation lever 4 makes contact with the stopper 12, the displacement of the cutting wire 7 in the direction approaching the axis line of the work 2 stops.

Thereby, not the entire hollowed-out bottom portion 2B is cut away, but a remaining portion is left in the bottom portion of the work. The remaining portion is left in this way for the following reason. If the entire hollowed-out bottom portion 2B is cut away, the hollowed-out portion of the work 2 may cause an uncontrollable behavior, such as coming out of the work 2 at high speed. Consequently, the safety of the working may be hindered.

After a predetermined hollowed-out bottom portion 2B has been formed, the rotation of the work 2 is stopped, and the operation lever 4 is returned to the original position. The cutting wire 7 has a certain level of thickness and thus has elasticity, and there is no direction in which the sag is released. Therefore, the cutting wire 7 returns to the arc-shaped position along the cylindrical main unit 3.

Next, FIG. 15(4), the working tool 1 is removed. After removing the working tool 1, an inner portion of the hollowed-out portion of the work 2 is hit by a hammer or the like. Then, the remaining portion is broken so that the hollowed-out work portion can be removed safely. This hollowed-out portion of the work is recycled as a material.

In forming the hollowed-out side portion 2A and the hollowed-out bottom portion 2B, air is injected into the space 14 through the air injection tube 13, and the injected air is passed through the air injection groove 15 and discharged from the distal end of the working tool 1. Thereby, an air flow is formed that turns around from the distal end, passes along the inner surface of the inner cylindrical body 9, and is guided into the dust collection hose 5. Thus, the chips produced when forming the hollowed-out side portion 2A and the hollowed-out bottom portion 2B are guided into the dust collection hose 5 efficiently.

In the closed-bottom cylindrical member fabricated in this manner, the hollowed-out side portion 2A and the hollowed-out bottom portion 2B are in a somewhat roughly worked condition. For this reason, finishing work is carried out finally by fine working or the like, and a crucible as a final product is fabricated.

Other Embodiments (1) In the foregoing embodiment, the cylindrical main unit 3 has the outer cylindrical body 8 and the inner cylindrical body 9. However, it is also possible to form the cylindrical main unit 3 with one cylindrical body, and the cutting blade 6 and the cutting wire 7 may be provided at the distal end of this one cylindrical body. When the cylindrical main unit comprises two cylindrical bodies 8 and 9, there is an advantage that the portion of the raw material that is lost as chips can be made smaller by making the thickness of each of the cylindrical bodies 8 and 9 smaller, in comparison with the case in which the cylindrical main unit has only one cylindrical body. Specifically, in the manufacturing method of the present invention, it is necessary that the cylindrical trench be formed with the cutting blade 6 and the cylindrical main body 3 be gradually inserted into the cylindrical trench. For this reason, the thickness of the cutting blade 6 is set wider than the thickness of the cylindrical main body 3. As a result, by providing the cylindrical main unit 3 with two cylindrical bodies 8 and 9 and also making the thickness of each of the cylindrical bodies 8 and 9 smaller, the thickness of the cutting blade 6 can be made smaller accordingly. Therefore, the portion of the raw material that is lost as chips can be made even smaller than in the case in which the cylindrical main unit has one cylindrical body.

(2) In the foregoing embodiment, the inner cylindrical body 9 is rotatable while the outer cylindrical body 8 is non-rotatable. However, both the outer cylindrical body 8 and the inner cylindrical body 9 may be configured to be rotatable. In such a configuration, by rotating the outer cylindrical body 8 and the inner cylindrical body 9 in such directions that the support part 20 and the support part 21 move away from each other along the circumferential direction, the cutting wire 7 can be displaced in a direction approaching the axis line of the work. Thereby, the hollowed-out bottom portion 2B can be formed by cutting work using the cutting wire 7.

(3) In the foregoing embodiment, the hollowed-out side portion 2A and the hollowed-out bottom portion 2B are successively formed using the working tool 1. However, it is also possible that, after forming the hollowed-out side portion 2A using a tool having a cutting blade as in the conventional example, the tool may be removed, and the working tool 1 may be then inserted in the bottom portion of the cylindrical trench to form the hollowed-out bottom portion 2B with the cutting wire 7. It should be noted that when such a manufacturing method is employed, it is not necessary that the cutting blade 6 and the cutting wire 7 are fitted to the distal end of the cylindrical main body 3 in the working tool 1 used, and it is sufficient that the working tool 1 has only the cutting wire 7 fitted thereto.

(4) In the foregoing embodiment, a method of manufacturing a closed-bottom cylindrical member and a working tool therefor are shown as an example of the method of manufacturing a member having a closed-bottom hole portion and an example of the working tool. However, the present invention is not limited thereto, and it can be applied to methods of manufacturing members that have a hole portion and the outer shape of which is, for example, in a rectangular parallelepiped shape or in a conical shape, and working tools used therefor.

INDUSTRIAL APPLICABILITY

The present invention is applicable to a method of manufacturing a member having a closed-bottom hole portion that is used for a carbonaceous crucible, by hollowing out a material made of a carbonaceous material, and to a working tool used for the manufacturing method.

REFERENCE SIGNS LIST

1—Working tool
2—Work (raw material)
2A—Hollowed-out side portion
2B—Hollowed-out bottom portion
3—Cylindrical main unit
4—Operation lever
5—Dust collection hose
6—Tip-shaped cutting blade
7—Cutting wire
8—Outer cylindrical body
9—Inner cylindrical body
10—Bearing
11—Stopper
13—Air injection tube
15—Air injection groove
16—Cylindrical trench
20—Stationary support part
21—Movable support part

The invention claimed is:

1. A method of manufacturing a member having a closed-bottom hole portion by inside-removing-working a raw material made of a carbonaceous material, the closed-bottom hole portion having a hollowed-out side portion and a hollowed-out bottom portion formed by hollowing out an inner portion of the raw material, comprising:

a step of mounting the raw material to a predetermined position of a lathe;

a step of forming a cylindrical trench by digging the raw material frontward from a near-side end face of raw material while rotating the raw material, to form the hollowed-out side portion; and a step of forming the hollowed-out bottom portion by supporting and fixing both ends of a cutting wire inserted into a bottom portion of the cylindrical trench at two points while rotating the raw material, and pressing a part of the cutting wire between the two points in a direction approaching an axis line of the raw material, wherein during said pressing, the cutting wire is straightened under tension and stress acting on the cutting wire is distributed between said two points, and during a normal state prior to said pressing, said cutting wire is bent into an arc shape; and at least one of i) preparing a working tool in advance, the working tool comprising a cylindrical main unit having the cutting wire of the two-point support structure and a cutting blade provided at a distal end portion thereof for digging a cylindrical trench;

ii) performing the step of forming cylindrical trench and the step of forming the hollowed-out bottom portion successively using the working tool; and iii) in at least one of the step of forming the cylindrical trench, and the step of forming the hollowed-out bottom portion, a dust discharging step of passing air through the cylindrical trench of the raw material to collect and discharge chips produced by cutting the raw material to outside; and a step of carrying out finishing work to the raw material having the hollowed-out side portion and the hollowed-out bottom portion formed;

thereby increasing cutting efficiency.

2. A method of manufacturing a member having a closed-bottom hole portion by inside-removing-working a raw material made of a carbonaceous material, the closed-bottom hole portion having a hollowed-out side portion and a hollowed-out bottom portion formed by hollowing out an inner portion of the raw material, comprising:

a step of forming a cylindrical trench by digging the raw material frontward from a near-side end face of raw material while rotating the raw material, to form the hollowed-out side portion;

a step of forming the hollowed-out bottom portion by supporting and fixing both ends of a cutting wire having a predetermined length inserted into a bottom portion of the cylindrical trench at two points while rotating the raw material, and pressing the cutting wire being supported at the two points in a direction approaching an axis line of the raw material;

preparing a working tool in advance, the working tool comprising a cylindrical main unit having a cutting wire of the two-point support structure and a cutting blade provided at a distal end portion thereof for digging a cylindrical trench; and performing the step of forming cylindrical trench and the step of forming the hollowed-out bottom portion successively using the working tool;

wherein: the cylindrical main unit comprises an outer cylindrical body and an inner cylindrical body, the outer cylindrical body and the inner cylindrical body being disposed so as to be overlapped concentrically;

one end of the cutting wire is fitted to one of the outer cylindrical body and the inner cylindrical body; the other end of the cutting wire is fitted to the other one of the outer cylindrical body and the inner cylindrical body; and, by rotating at least one of the outer cylindrical body and the inner cylindrical body relatively to each other, the cutting wire is displaced in a direction approaching an axis line of the raw material to form the hollowed-out bottom portion.

3. A method of manufacturing a member having a closed-bottom hole portion by inside-removing-working a raw material made of a carbonaceous material, the closed-bottom hole portion having a hollowed-out side portion and a hollowed-out bottom portion formed by hollowing out an inner portion of the raw material, comprising:

a step of forming a cylindrical trench by digging the raw material frontward from a near-side end face of raw material while rotating the raw material, to form the hollowed-out side portion;

a step of forming the hollowed-out bottom portion by supporting a cutting wire inserted into a bottom portion of the cylindrical trench at two points while rotating the raw material, and pressing the cutting wire being supported at the two points in a direction approaching an axis line of the raw material;

preparing a working tool in advance, the working tool comprising a cylindrical main unit having a cutting wire of the two-point support structure and a cutting blade provided at a distal end portion thereof for digging a cylindrical trench; and performing the step of forming cylindrical trench and the step of forming the hollowed-out bottom portion successively using the working tool;

wherein the cylindrical main unit comprises an outer cylindrical body and an inner cylindrical body, the outer cylindrical body and the inner cylindrical body being disposed so as to be overlapped concentrically; one end of the cutting wire is fitted to one of the outer cylindrical body and the inner cylindrical body; the other end of the cutting wire is fitted to the other one of the outer cylindrical body and the inner cylindrical body; and, by rotating at least one of the outer cylindrical body and the inner cylindrical body relatively to each other, the cutting wire is displaced in a direction approaching an axis line of the raw material to form the hollowed-out bottom portion.

\* \* \* \* \*